United States Patent
Jia et al.

(10) Patent No.: US 7,532,791 B2
(45) Date of Patent: May 12, 2009

(54) ULTRAFAST LASER MACHINING SYSTEM AND METHOD FOR FORMING DIFFRACTIVE STRUCTURES IN OPTICAL FIBERS

(75) Inventors: Jimmy Yi-Jie Jia, Cambridge, MA (US); Ming Li, Cambridge, MA (US); Rajminder Singh, Cambridge, MA (US); Xinbing Liu, Cambridge, MA (US); Tetsuo Ohara, Cambridge, MA (US)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/044,387

(22) Filed: Mar. 7, 2008

(65) Prior Publication Data

US 2008/0273836 A1 Nov. 6, 2008

Related U.S. Application Data

(62) Division of application No. 11/213,412, filed on Aug. 26, 2005, now Pat. No. 7,366,378.

(60) Provisional application No. 60/623,285, filed on Oct. 29, 2004, provisional application No. 60/623,286, filed on Oct. 29, 2004.

(51) Int. Cl.
    *G02B 6/34* (2006.01)
(52) U.S. Cl. ........................................... 385/37
(58) Field of Classification Search ........................ None
    See application file for complete search history.

(56) References Cited

U.S. PATENT DOCUMENTS 4,911,516 A 3/1990 Palfrey et al. ................. 385/37

(Continued)

FOREIGN PATENT DOCUMENTS

EP 0 978 738 2/2000

(Continued)

OTHER PUBLICATIONS

Mihalov S J et al Optical Society of America/Institute of Electrical and Electronics Engineers: "Fiber Bragg Gratings (FBG) Made With A Phase Mask and 800-nm Femtosecond Radiation" Optical fiber Communication Conference (OFC). Post Conference Digest. Atlanta, GA Mar. 23-28, 2003, Trends In Optics and Photonics Series. (TOPS), Washington, DC; OSA, US vol. TOPS. vol. 86, Mar. 23, 2003 (Feb. 23, 2003), pp. PD30-01, XP010680610 (the whole document).

(Continued)

*Primary Examiner*—Sung H Pak
(74) *Attorney, Agent, or Firm*—RatnerPrestia

(57) ABSTRACT

An ultrafast laser machining system and method to form diffractive structures in optical fibers. The fiber is mounted with its longitudinal axis perpendicular to the beam path of the laser pulses. A region of the fiber is illuminated and then imaged with two cameras. These cameras are aligned substantially orthogonally. A position of the beam spot is determined. The beam spot is aligned to a starting position within the region. This position is within a portion of the fiber to be machined for which the beam path passes through the greatest length of material. The beam spot is scanned along a path designed to pass the beam spot through all of the portion to be machined such that the beam path does not pass through previously machined material. The laser pulses, which have a duration of less than about 1 ns, are generated as the beam spot is scanned.

40 Claims, 7 Drawing Sheets

U.S. PATENT DOCUMENTS

| | | | |
|---|---|---|---|
| 5,848,204 A | 12/1998 | Wanser | 385/12 |
| 6,195,483 B1 | 2/2001 | Moon et al. | 385/37 |
| 6,229,939 B1 | 5/2001 | Komine | 385/29 |
| 6,282,341 B1 | 8/2001 | Digonnet et al. | 385/37 |
| 6,633,419 B2 | 10/2003 | Hosono et al. | |
| 7,031,571 B2 | 4/2006 | Mihailov et al. | |
| 7,174,077 B1 | 2/2007 | Howard | 385/123 |
| 7,376,307 B2 * | 5/2008 | Singh et al. | 385/37 |
| 2002/0003926 A1 | 1/2002 | Enomoto et al. | 385/37 |
| 2003/0138229 A1 | 7/2003 | Paek et al. | 385/123 |
| 2004/0184734 A1 | 9/2004 | Mihailov et al. | 385/37 |
| 2004/0252939 A1 | 12/2004 | Gaylord et al. | 385/28 |
| 2005/0194365 A1 | 9/2005 | Li | |
| 2007/0091977 A1 | 4/2007 | Sohn et al. | |
| 2008/0193085 A1 * | 8/2008 | Singh et al. | 385/37 |

FOREIGN PATENT DOCUMENTS

| | | |
|---|---|---|
| JP | 2003-279759 | 10/2003 |
| JP | 2003279759 | 10/2003 |
| JP | 2004 038017 | 2/2004 |
| WO | WO 01/54853 | 8/2001 |

OTHER PUBLICATIONS

Kashyap R et al: "UV Written Reflection Grating Structures In Photosensitive Optical Fibres Using Phase-Shifted Phase Mask" Electronics Letters, IEE Stevenage, GB, vol. 30, No. 23, Nov. 10, 1994, pp. 1977-1978, XP006001347; ISSN: 0013-5194 (the whole document).

Ostlender A et al: Metrology For Laser-Structured Microdevices By CCD-Camera Based Vision Systems: Proceeding of the SPIE, SPIE, Bellingham VA, US, vol. 4178, 2000, pp. 197-206, XP002326972 ISSN: 0277-786X, (the whole document).

PCT International Search Report; PCT/US2005/036499; Completed Mar. 8, 2006.

K.O. Hill et al.; Photosensitivity in Optical Fiber Waveguides: Application to Reflection Filter Fabrication; Applied Physics Letters 32(10). pp. 647-649, May 1978.

* cited by examiner

ULTRAFAST LASER MACHINING SYSTEM AND METHOD FOR FORMING DIFFRACTIVE STRUCTURES IN OPTICAL FIBERS

This is a divisional application of U.S. patent application Ser. No. 11/213,412, filed Aug. 26, 2005.

This application claims the benefit under Title 35 U.S.C. § 119(e) of U.S. Provisional Application No. 60/623,285 filed on Oct. 29, 2004 and U.S. Provisional Application No. 60/623,286 filed on Oct. 29, 2004, the contents of which are incorporated herein by reference.

FIELD OF THE INVENTION

The present invention relates generally to systems and methods for the laser machining of structures within optical fibers. More particularly these systems and methods may be used to form long period Bragg gratings, photonic crystal structures, and/or diffractive optical elements within the cores of optical fibers.

BACKGROUND OF THE INVENTION

A Bragg grating is a periodic or aperiodic perturbation of the effective absorption coefficient and/or the effective refractive index of an optical waveguide. More simply put, a Bragg grating can reflect a predetermined narrow or broad range of wavelengths of light incident on the grating, while passing all other wavelengths of the light. Such structures provide a desirable means to manipulate light traveling in the optical waveguide.

A fiber Bragg grating (FBG) is a Bragg grating formed in an optical fiber. FBG's may be formed from photo-imprinted gratings in optical fibers. Photo-imprinting involves the irradiation of an optical waveguide with a laser beam of ultraviolet light to change the refractive index of the core of the waveguide. By irradiating the fiber with an intensive pattern that has a periodic (or aperiodic) distribution, a corresponding index perturbation is permanently induced in the core of the waveguide. The result is an index grating that is photo-imprinted in the optical waveguide. This method requires that the glass be photosensitive, an effect discovered in 1978 by Dr. Kenneth Hill of the Communications Research Centre Canada.

The FBG may become a very selective spatial reflector in the core of the fiber. Any change to the spatial period of the grating, or index of refraction, causes a proportional shift in the reflected and transmitted spectrum. FBG's have proven attractive in a wide variety of optical fiber applications, such as: narrowband and broadband tunable filters; optical fiber mode converters; wavelength selective filters, multiplexers, and add/drop Mach-Zehnder interferometers; dispersion compensation in long-distance telecommunication networks; gain equalization and improved pump efficiency in erbium-doped fiber amplifiers; spectrum analyzers; specialized narrowband lasers; and optical strain gauges in bridges, building structures, elevators, reactors, composites, mines and smart structures.

Since their market introduction in 1995, the use of optical FBG's in commercial products has grown exponentially, largely in the fields of telecommunications and stress sensors. The demand for more bandwidth in telecommunication networks has rapidly expanded the development of new optical components and devices (especially Wavelength Division Multiplexers). FBG's have contributed to the phenomenal growth of some of these products, and are recognized as a significant enabling technology for improving fiber optic communications.

Photo-imprinted FBG's may have low insertion losses and are compatible with existing optical fibers used in telecommunication networks, but as the optical power being transmitted in a photo-imprinted FBG increases, some undesirable effects may arise. One drawback of photo-imprinted FBG's is the requirement that the optical fiber have a photosensitive core. Photosensitive materials typically have absorption coefficients higher than are desirable for high power applications, as well as potentially undesirable non-linearities that may become large at high optical powers. Photo-imprinted FBG's are also susceptible to degradation over time, particularly is the photosensitive material of the fiber core is heated or exposed to UV radiation.

In their article, FIBER BRAGG GRATINGS MADE WITH A PHASE MASK AND 800-NM FEMTOSECOND RADIATION (Optics Letters, Vol. 28, No. 12, pgs. 995-97 (2003)), Stephen J. Mihailov, et al. disclose a first order FBG formed in a single mode fiber using a femtosecond laser. The single mode fiber used was a standard SMG-28 telecommunications fiber with a non-photosensitive Ge doped core. The authors were able to form a first order Bragg grating structure in this core. This direct laser written single mode FBG was found to have superior thermal stability as compared to a photo-imprinted FBG.

The direct laser written single mode FBG of Stephen J. Mihailov, et al. may overcome many of the disadvantages of the photo-imprinted FBG's. Such single mode FBG's may be formed using the relatively standard ultrafast laser machining system disclosed by Stephen J. Mihailov, et al. The formation of more complex diffractive structures within optical fibers, particularly three dimensional structures formed within multimode optical fibers, such as diffractive coupling optics and photonic crystals, may benefit from the use of an exemplary ultrafast laser machining system with additional monitoring and control features as described in the present invention. The present invention also allows a number of additional improvements even to less complex diffractive structures formed within optical fibers that may lead to superior performance, particularly at higher power levels, as well as increasing the versatility of the diffractive structures that may be formed.

SUMMARY OF THE INVENTION

An exemplary embodiment of the present invention is an ultrafast laser machining system to form a diffractive structure in an optical fiber. The ultrafast laser machining system includes: a pulsed laser source for generating pulses of laser light; optics aligned in a beam path of laser pulses to focus the pulses to a beam spot; a fiber mount to hold and controllably move the optical fiber such that the beam spot is aligned to a target region within the optical fiber; and an imaging system to image the target region. Each pulse of laser light has a pulse energy equal to a machining energy level and a predetermined pulse width less than about 1 ns. The fiber mount includes: a first linear translation stage to move the optical fiber in the Z direction, substantially parallel to a direction of propagation of the laser pulses; a second linear translation stage to move the optical fiber in the Y direction, substantially perpendicular to the direction of propagation of the laser pulses and substantially parallel to the longitudinal axis of the optical fiber; and a fiber holder coupled to the two linear translation stages to hold the optical fiber. The imaging system includes a light source to illuminate the target region of the optical fiber and two digital cameras aligned to image the target region of the held optical fiber from substantially orthogonal directions.

Another exemplary embodiment of the present invention is an ultrafast laser machining system to form a Bragg grating structure in an optical fiber. The ultrafast laser machining system includes: a pulsed laser source for generating pulses of laser light; a beam divider aligned in the beam path of the pulses of laser light to divide the beam path into multiple branches; optics aligned in the branches of the beam path of laser pulses to focus the pulses to multiple beam spots having substantially equal fluence; a fiber mount to hold and controllably move the optical fiber such that each beam spot is aligned to a target region within the optical fiber; and an imaging system to image the target region. Each pulse of laser light has a pulse energy equal to a machining energy level and a predetermined pulse width less than about 1 ns. A portion of each pulse of laser light is propagated along each of the branches and each beam spot corresponds to one of these branches. The fiber mount includes: a linear translation stage to move the optical fiber in the Z direction, substantially parallel to a direction of propagation of the laser pulses; and a fiber holder coupled to the linear translation stages to hold the optical fiber. The imaging system includes a light source to illuminate the target region of the optical fiber and two digital cameras aligned to image the target region of the held optical fiber from substantially orthogonal directions.

An additional exemplary embodiment of the present invention is a method to form a diffractive structure in an optical fiber using an ultrafast laser machining system. The optical fiber is mounted in a fiber mount of the ultrafast laser machining system with the longitudinal axis of the optical fiber perpendicular to the beam path of pulses of laser light of the ultrafast laser machining system. A target region of the optical fiber is illuminated with illumination light and the target region is imaged with two digital cameras. The digital cameras are aligned in substantially orthogonal directions to produce pairs of substantially orthogonal alignment images of the target region. An initial position, within the target region, of the beam spot formed by a focusing mechanism of the ultrafast laser machining system is determined. The beam spot is aligned to a starting position within the target region of the optical fiber. The starting position is within a portion of the optical fiber to be machined to form the diffractive structure for which the beam path of the laser pulses passes through the greatest length of optical fiber material to reach the beam spot. The beam spot is scanned along a machining path within the target region of the optical fiber. The machining path is designed to pass the beam spot through all of the portion of the optical fiber to be machined such that the beam path does not pass through previously machined material of the optical fiber. The pulses of laser light, which have a duration of less than about 1 ns, are generated to machine material of the optical fiber as the beam spot is scanned, thereby forming the diffractive structure within the optical fiber.

A further exemplary embodiment of the present invention is a method to form a repetitive diffractive structure in an optical fiber using an ultrafast laser machining system with multiple parallel processing beam paths. The optical fiber is mounted in a fiber mount of the ultrafast laser machining system with the longitudinal axis of the optical fiber perpendicular to the parallel processing beam paths of pulses of laser light of the ultrafast laser machining system. A target region of the optical fiber is illuminated with illumination light and the target region is imaged with two digital cameras. The digital cameras are aligned in substantially orthogonal directions to produce pairs of substantially orthogonal alignment images of the target region. Initial positions, within the target region, of the multiple beam spots formed by a focusing mechanism of the ultrafast laser machining system are determined. Each of the beam spots corresponding to one of the parallel processing beam paths of the ultrafast laser machining system. Each beam spot is aligned to one of a number of starting positions within the target region of the optical fiber. Each starting position is within a portion of the optical fiber to be machined to form the diffractive structure for which the corresponding one of the parallel processing beam paths passes through the greatest length of optical fiber material to reach the beam spot. Each beam spot is scanned in parallel along one of a number of machining paths within the target region of the optical fiber. Each machining path is designed to pass the corresponding beam spot through all of the portion of the optical fiber to be machined to form the corresponding section of the repetitive diffractive structure such that none of the parallel processing beam paths passes through previously machined material of the optical fiber. The pulses of laser light, which have a duration of less than about 1 ns, are generated to machine material of the optical fiber as the parallel processing beam paths are scanned in parallel, thereby forming the repetitive diffractive structure within the optical fiber.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
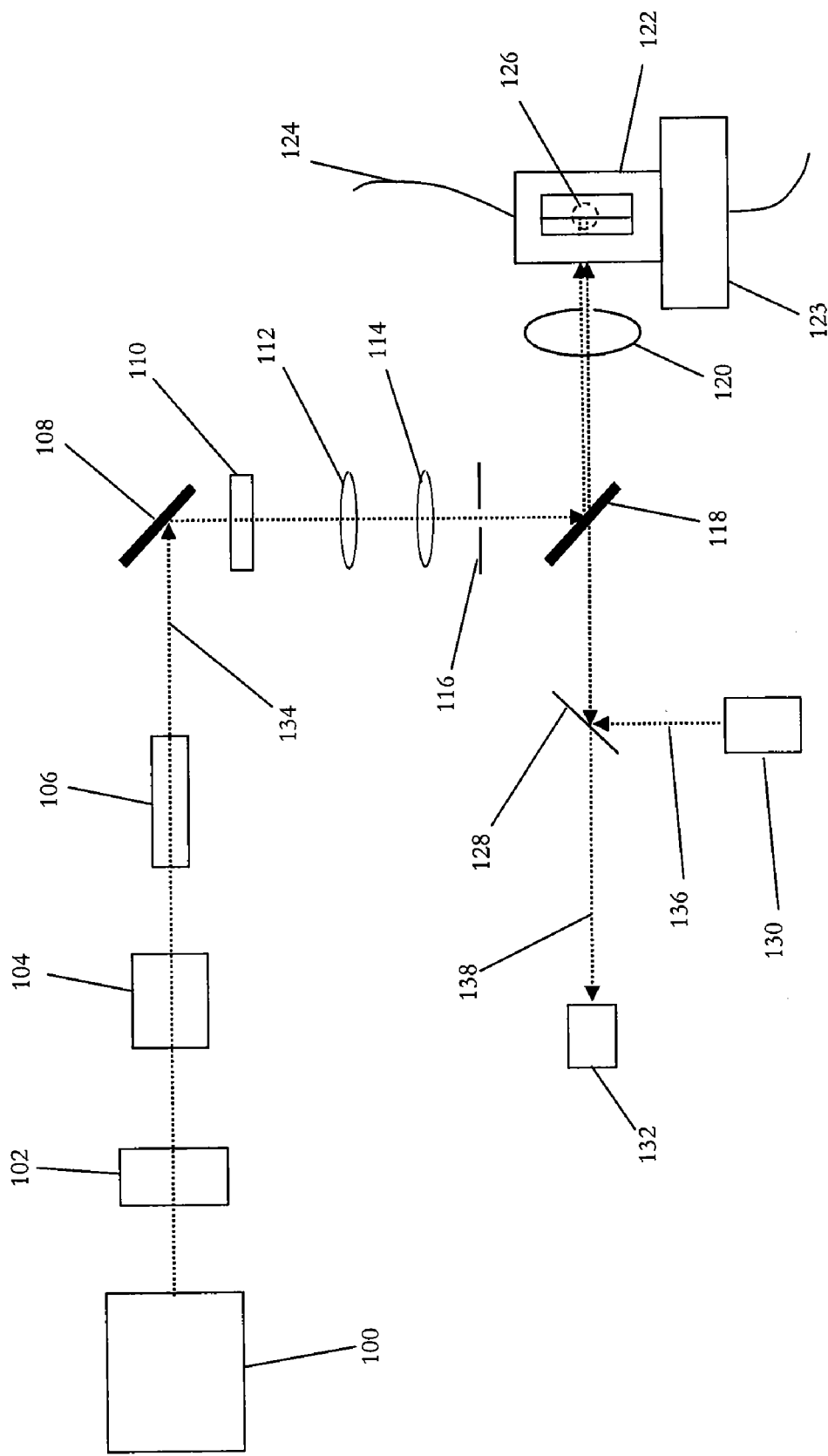
FIG. 1 is a schematic block diagram illustrating an exemplary ultrafast laser machining system according to the present invention.

The extremely high intensities achievable in ultrafast laser machining of materials allow the material to be changed in a number of ways. The most common way that a material may be changed during ultrafast laser machining is for the material to be removed from the surface via ablation. Alternatively, various properties of the material may be changed such as the crystallinity and/or the refractive index. These material changes may occur on the surface of the material or, for substantially transparent materials, the ultrafast pulses may be focused within the material to cause these changes to take place inside of the bulk of the material. These internal changes may occur only above a specific fluence, so that the intervening material may be unaffected by the ultrafast laser pulses. Careful control of the pulse energy, pulse duration, and focus of the pulses may allow for the creation of precise regions with changed properties that have sharp boundaries.

Thus, the use of ultrafast lasers for direct writing of Bragg grating structures in optical fibers may have the advantage of providing sharp contrasts between index-altered portions of the fiber and surrounding unaltered portions of the fiber.

Single mode optical fibers have relatively small fiber cores, typically less that 9 μm for telecommunication wavelengths. Additionally, since light propagates in only one mode in these fibers, there are relatively few diffractive optical structures that may be useful in these fibers. Multimode fibers, however, have significantly more space for forming structures within the core. Typical multimode fiber core radii range from about 10 μm to about 200 μm, with 25 μm and 31.25 μm being the most common multimode fiber core radii for telecommunication wavelengths. Also, the multiple transverse modes utilized by light propagating in multimode fibers lead to a large number of potential structural forms for controlling and monitoring light in these fibers.

Using the exemplary apparatus and methods of the present invention, diffractive structures may also be formed in multicore optical fibers, whether the multiple cores are arranged side by side or coaxially. These exemplary diffractive structures may affect the propagation of light within the different cores of the multicore fiber or the may couple modes between the cores. Additionally, diffractive structures may be formed, using the exemplary apparatus and methods of the present invention, in elliptical and other polarization maintaining optical fibers.

Thus, applying ultrafast laser machining techniques to multimode optical fibers creates a significant expansion of the potential uses of direct laser written structures in optical fibers over the first order, single mode FBG's disclosed in the article by Stephen J. Mihailov, et al. These exemplary structures include: multimode long period FBG's (LPFBG's); multimode optical fibers with helical FBG structures, integral photonic crystal sections, and/or diffractive coupling optics; optical fibers (including high power, hollow fibers) with FBG's formed in the cladding layer; and wavelength stabilized, high power, uncooled laser sources.

Figure 2:
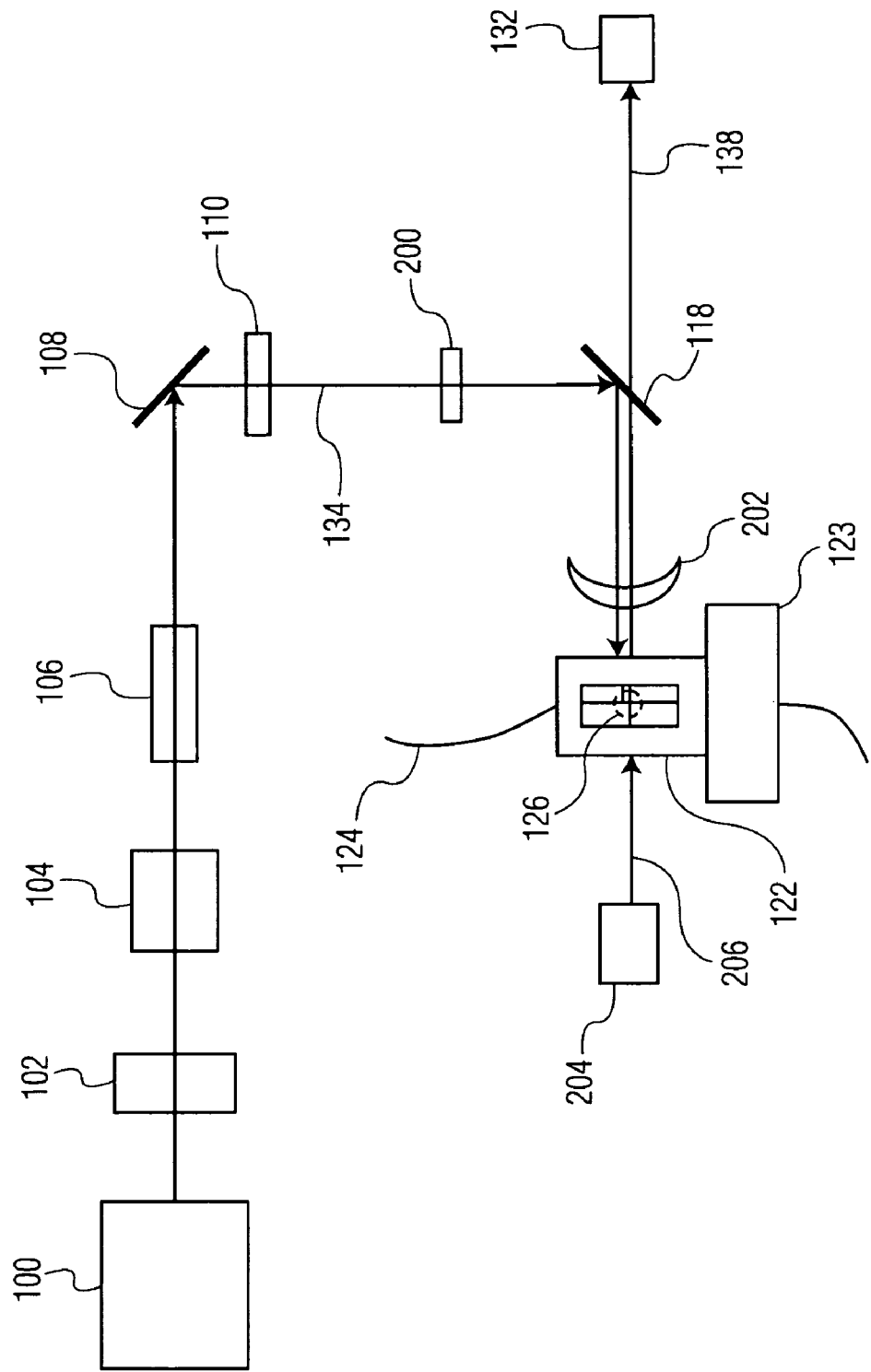
FIG. 2 is a schematic block diagram illustrating an alternative exemplary ultrafast laser machining system according to the present invention.

FIGS. 1 and 2 illustrate simplified block diagrams of two exemplary ultrafast laser machining systems for forming diffractive structures within optical fibers according to the present invention. The exemplary system of FIG. 1 includes: ultrafast laser oscillator 100; shutter 102; variable attenuator 104; harmonic generating crystal 106; dichroic mirrors 108 and 118; polarization control means 110; a beam divider including lenses 112 and 114 and mask 116; focusing mechanism 120; a fiber mount which includes fiber holder 122 and positioning apparatus 123; and an imaging system including light source 130, beam splitter 128, and digital camera 132. The optical paths in the exemplary system are shown as dotted lines 134, 136, and 138. The exemplary system of FIG. 2 is similar to the exemplary system of FIG. 1, except that it includes an alternative beam divider, focusing mechanism, and imaging system.

Figure 3B:
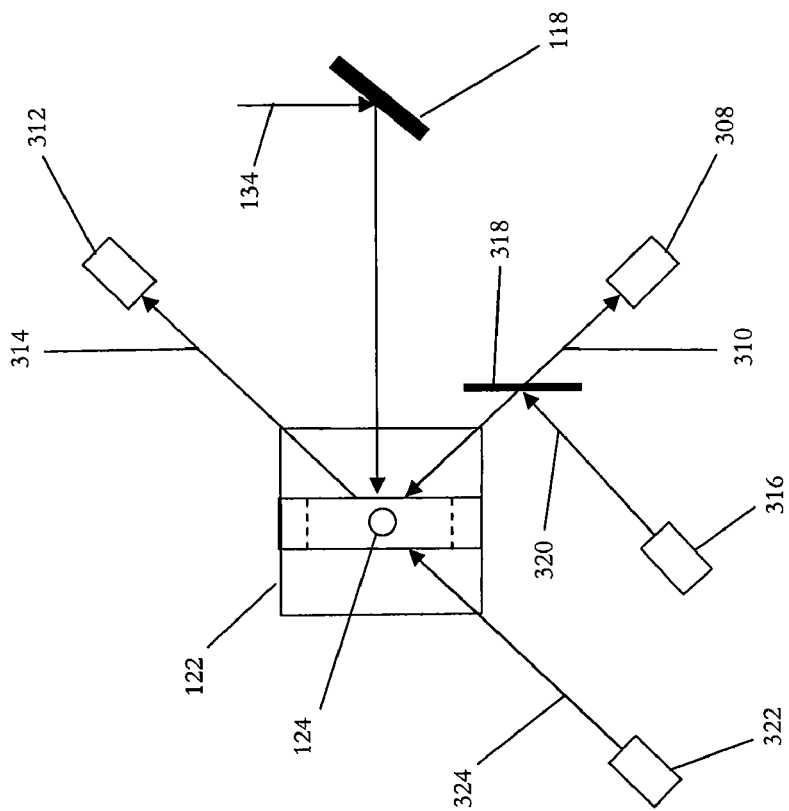
FIG. 3B is a top schematic diagram illustrating an alternative exemplary imaging system to image the target region of the held optical fiber in an exemplary ultrafast laser machining system of FIG. 1 or 2.
Figure 3A:
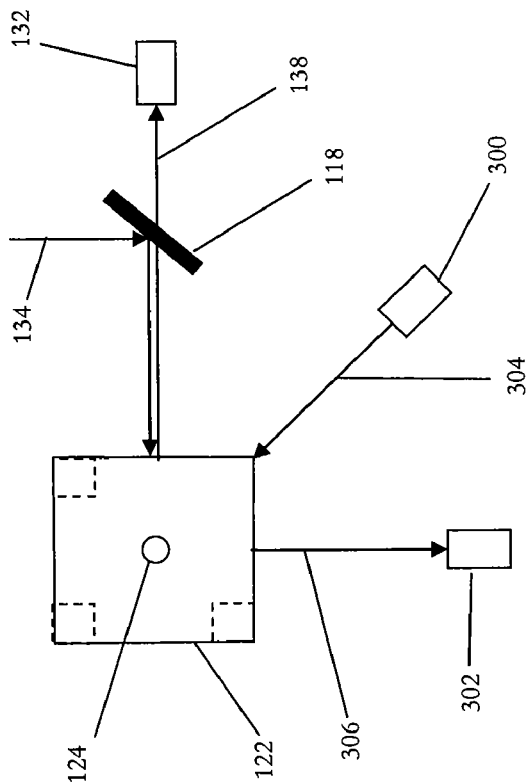
FIG. 3A is a top schematic diagram illustrating an exemplary imaging system to image the target region of the held optical fiber in an exemplary ultrafast laser machining system of FIG. 1 or 2.

It is noted that, although the imaging system of an exemplary system of the present invention desirably includes two digital cameras aligned to image target region 126 of held optical fiber 124 from substantially orthogonal directions, the exemplary block diagrams of FIGS. 1 and 2 each illustrate only one digital camera. The second camera has been omitted in these Figures to simplify the drawings. FIGS. 3A and 3B illustrate exemplary imaging systems including two digital cameras to demonstrate two possible alignments of a second camera in FIGS. 1 and 2.

In this exemplary system, ultrafast laser oscillator 100 may desirably include any type of solid state gain medium typically used for ultrafast laser machining applications, such as: Cr:YAG (peak fundamental wavelength, $\lambda f=1520$ nm); Cr:Forsterite ($\lambda f=1230$-$1270$ nm); Nd:YAG and Nd:YVO4 ($\lambda f=1064$ nm); Nd:GdVO4 ($\lambda f=1063$ nm); Nd:YLF ($\lambda f=1047$ nm and 1053 nm); Nd:glass ($\lambda f=1047$-$1087$ nm); Yb:YAG ($\lambda f=1030$ nm); Cr:LiSAF ($\lambda f=826$-$876$ nm); Ti:Sapphire ($\lambda f=760$-$820$ nm); and Pr:YLF ($\lambda f=612$ nm). These solid state gain media may be pumped using standard optical pumping systems such as erbium doped fiber lasers and diode lasers, the output pulses of which may be directly coupled into the solid state gain medium or may undergo harmonic generation before being used to pump the solid state gain medium. The solid state gain medium (media) may be configured to operate as one or more of: a laser oscillator; a single pass amplifier; and/or a multiple pass amplifier. This element may also include optics to substantially collimate the laser light.

Ultrafast laser oscillator 100 may desirably produce nearly Fourier-transform limited pulses having a duration of less than about 1 ns, typically less than 50 ps. These pulses are desirably produced at repetition rate at least in the KHz range. Higher pulse repetition rates are generally desirable to allow more rapid machining of the exemplary grating structures, as long as there is sufficient time between the pulses to allow heat dissipation within the optical fiber. Pulse repetition rates as high as 200 MHz or greater are contemplated.

An additional, non-solid state, single or multiple pass amplifier such as a XeCl, KrF, ArF, or F2 excimer amplifier (not shown) may be included to increase the output power of ultrafast laser oscillator 100. Alternatively, ultrafast laser oscillator 100 may include an ultrafast excimer laser system (e.g. XeCl, $\lambda f=308$ nm; KrF, $\lambda f=248$ nm; ArF, $\lambda f=193$ nm; or F2, $\lambda f=157$ nm) or an ultrafast dye laser system (e.g. 7-diethylamino-4-methylcoumarin, $\lambda f=435$-$500$ nm; benzoic acid, 2-[6-(ethylamino)-3-(ethylimino)-2,7-dimethyl-3H-xanthen-9-yl]-ethyl ester, monohydrochloride, $\lambda f=555$-$625$ nm; 4-dicyanmethylene-2-methyl-6-(p-dimethylaminostyryl)-4H-pyran, $\lambda f=598$-$710$ nm; or 2-(6-(4-dimethylaminophenyl)-2,4-neopentylene-1,3,5-hexatrienyl)-3-methylbenzothiazolium perchlorate, $\lambda f=785$-$900$ nm).

Shutter 102, aligned in beam path 134, may be used to control transmission of the pulsed laser light laser from laser source 100 (i.e. open during machining and closed to block the beam when not machining). This may extend the life of other components in the exemplary laser machining system and allow for the use of scanning techniques such as raster scanning in exemplary embodiments of the present invention.

Variable attenuator 104 desirably allows for fine control of the pulse energies, and thus the beam fluence, to maintain a desirable machining energy level. Variable attenuator 104 may be any type of controllable variable attenuator that may withstand the high peak powers associated with ultrafast lasers, for example a pair of linear polarizing members arranged on either side of a controllable polarization rotation element such as a Pockels cell, Kerr cell, or a liquid crystal. Alternatively, a fixed linear polarizing member and a rotatable polarization member may be used as variable attenuator 104. The resulting control of pulse energies, possibly in conjunction with control of the focus of the beams spot(s), allows fine control of the fluence of the laser pulses in the beam spot(s) in the target region 126 of held optical fiber 124, thereby controlling the machining volume of target region 126 machined by a beam spot during one of the pulses of laser light. The fine control of the fluence may allow exemplary systems of the present invention to machine volumes which are either larger or smaller than the minimum spot size that may be achieved for light of a particular wavelength with a single pulse. Variable attenuator 104 may also be used to vary the beam fluence used for machining and/or alignment, while desirably allowing laser source 100 to be operated at a constant pulse power level, even during the generating of lower fluence alignment pulses.

The attenuated beam then enters harmonic generating crystal 106. This crystal may be designed to double, triple, or quadruple the fundamental frequency of the laser pulses generated by ultrafast laser oscillator 100 to produce ultrafast UV pulses, which may desirably have a peak wavelength shorter than about 388 nm and a duration of less than 1 ns and preferably less than 50 ps. The efficiency of harmonic generation in harmonic generating crystal 106 may vary with the thickness of the crystal. Also, the efficiency of harmonic generating crystal 106 may vary with the intensity of the fundamental light incident on the crystal and, thus, the selection of the desired attenuation of variable attenuator 104 desirably accounts for this variable as well. It is noted that harmonic generation crystals may desirably be optimized to provide desirable phase matching for a particular input fundamental wavelength and harmonic number. Therefore, although it may be possible to tune the peak wavelength of ultrafast laser oscillator 100 over a significant range, such tuning may not be desirable for harmonic generation.

Also, it is noted that for ultrafast laser pulses of less than 1 ns, as desired in the present invention, the Fourier-transform limited bandwidth of these pulses may be relatively broad. Harmonic generation using such broad bandwidth is complicated by the desired phase matching criteria between the fundamental and harmonic at the output side of harmonic generating crystal 106. One method to achieve the desired phase matching criteria for these relatively broad bandwidth pulses is to reduce the thickness of harmonic generating crystal 106, which may lower the efficiency of harmonic generation.

It is noted that the primary machining mechanism for ultrafast laser pulses typically does not involve single photon absorption. Therefore, using harmonic generating crystal 106 to reduce the peak wavelength of the ultrafast laser pulses only minimally affects the volume of material machined at a given fluence. Rather, the main effect of reducing the peak wavelength of the ultrafast laser pulses is to reduce the minimum beam spot that may be achieved by focusing mechanism 120.

Polarization control means 110 may be aligned in beam path 134 to desirably control the polarization of the laser pulses, preferably transforming their polarization to circular polarization. The use of circularly polarized light and a round cross section beam spot has been found to produce consistently ellipsoidal machining areas with round cross-sections within the body of a work piece, including spherical machining areas. Thus, circularly polarized light may be desirable to form the most reproducible features by laser machining. The laser pulses incident on polarization control means 110 may be linearly polarized, in which case polarization control means 110 is desirably a quarter wave plate optimized for the peak wavelength of the laser pulses. This is particularly likely if variable attenuator 104 is a polarization based attenuator. If the laser pulses incident on polarization control means 110 are not polarized already, polarization control means 110 may desirably include a linear polarizing member followed by a quarter wave plate. The bandwidth of the laser pulses may mean that not all of the wavelengths may be nearly circularly polarized by the quarter wave plate, but, for a nearly Fourier-transform limited pulse, the majority of the energy in the pulse should be at wavelengths close enough to the peak wavelength to ignore this effect.

Desirably, both mirror 108 and mirror 118 are dichroic mirrors designed to have a high reflectivity (>95%) throughout the bandwidth of the pulses, as well as desirably minimal absorption at the fundamental wavelength of ultrafast laser oscillator 100, and any harmonics that might be generated in harmonic generating crystal 106. Exemplary dichroic mirrors may also desirably have high transmission (>99%) for shorter wavelengths, such as the fundamental wavelength of ultrafast laser oscillator 100 if harmonic generating crystal 106 is used, as well as the peak wavelength of light source 130 of the imaging system, particularly if optical beam 136 of light source 130 is aligned to irradiate target area 126 along the same optical path as optical beam 134 of laser source 100, as shown in the exemplary system of FIG. 1. These dichroic mirrors are desirably formed of a large number of dielectric layers, with thicknesses on the order of the peak wavelength of the laser pulses. The broader the desired high reflectivity bandwidth of these dichroic mirrors, the more complex this layered dielectric structure becomes. Thus, it is desirable to substantially maintain the bandwidth of these pulses near their Fourier-transform limit.

This pair of mirrors, 108 and 118, allows steering of optical beam 134 and, also, helps to prevent any unwanted light that may be emitted from harmonic generating crystal 106 at the fundamental wavelength, or lower harmonics than the desired harmonic of the laser pulses, from reaching the target area 126 on optical fiber 124. Dichroic mirror 118 may also desirably allow optical beam 136 from light source 130 to be efficiently transmitted for illuminating and imaging optical fiber 124.

An alternative embodiment of the present invention, described below with reference to FIG. 6, uses an ultrafast laser machining system that includes a beam divider aligned in the beam path of the pulses of laser light to divide the beam path into a number of branches. This alternative embodiment may allow for repetitive diffractive structures to be formed in parallel within optical fiber 124. In this alternative exemplary embodiment a portion of each pulse of laser light is propagated along each of the branches to form a separate beam spot within optical fiber 124. These multiple beam spots desirably have substantially equal pulse energies and fluences.

FIG. 1 illustrates an exemplary ultrafast laser machining system that includes mask 116 as a beam divider. Mask 116 includes multiple pinholes corresponding to the branches. If these pinholes are irradiated by substantially collimated light, the resulting branches propagate substantially parallel to one another. The pinholes in mask 116 may be desirably formed in a line to allow parallel processing of the diffractive structure along the length of optical fiber 124, or may be formed in another desired pattern. The pinholes in mask 116 may be sized and spaced to form the desired set of beam spots when focused by focusing mechanism 120. Both the type of focusing mechanism used and the magnification of the focusing mechanism may affect the sizing and spacing of the pinholes of mask 116.

Optical beam 134 may be expanded by a beam expander, illustrated as lenses 112 and 114 in FIG. 1, to allow for more even and/or efficient irradiation of the pinholes of mask 116 by the pulses of laser light in optical beam 134. For example, a beam expander formed of two cylindrical lenses 112 and 114 may expand the height of the beam path without expanding the width. Such an exemplary beam shape may be desirable to irradiate a line of pinholes formed in mask 116 with less wasted laser pulse energy. Lenses 112 and 114 have desirably low absorptivity and low chromatic aberration within the bandwidth of the laser pulses. Alternatively, spherical or aspherical lens based beam expanders or diffractive optical element beam shapers may be used to provide a more desirable beam shape for irradiating the pinholes of mask 116.

FIG. 2 illustrates an exemplary beam divider that includes diffractive optical element (DOE) 200. This diffractive optical element may divide the laser pulses of optical beam 134 into a number of branches having substantially equal pulse energies more efficiently that mask 116. The branches formed by DOE 200 propagate in separate directions, rather than substantially parallel, as with exemplary mask 116 of FIG. 1. One skilled in the art may understand that, the tradeoff between the increased efficiency of DOE 200 and the substantially parallel branches formed by using mask 116 may lead to the selection of one of these exemplary beam dividers, depending on the desired application.

In the exemplary system of FIG. 1, mirror 118 guides optical beam 134 into focusing mechanism 120 to focus the pulses of laser light to a beam spot within target region 126. This beam spot may be substantially diffraction limited or it may be larger depending on the size of the diffractive structures to be formed in optical fiber 124. For example, the optics may focus the laser pulses such that the beam spot has a machining volume from about 0.001 $\mu m^3$ to greater than hundreds of $\mu m^3$, the machining volume defining a portion of the target region machined by one of the plurality of pulses of laser light, which may not match the volume of the beam spot waist. This is because as the optical beam, or branch thereof, is focused; the fluence of the beam increases, eventually reaching a machining fluence level. This is the mechanism that allows an ultrafast pulsed laser system to machine material inside of a substantially transparent body, such as an optical fiber.

Thus, focusing mechanism 120 desirably has a relatively high numerical aperture. A higher numerical aperture allows focusing mechanism 120 to more precisely control the depth at which laser machining of optical fiber 124 begins. The steep cone angles achievable using high numerical aperture optics may be desirable to decrease the distance within the beam spot, in the direction of propagation, in which the machining fluence is reached. However, a higher numerical aperture also reduces the working distance between focusing mechanism 120 and optical fiber 124. The desired working distance may be based on many factors, but it may be desirable to have a working distance of greater than 0.8 mm, which may translate into a numerical aperture of about 0.5±0.1, depending on the size of optical beam 134. Working distances of greater than about 1.5 mm may undesirably lower the numerical aperture; however this does not exclude such working distances.

Thus, focusing mechanism 120 may desirably include a microscope objective with a numerical aperture in the range of up to about 1.5. Alternatively, other lens systems, including: singlet lenses; doublet lenses; aspheric lenses; and/or cylindrical lenses, may be included in focusing mechanism 120. High numerical aperture oil immersed lens systems may be used in focusing mechanism 120 to allow steep cone angles. Focusing mechanism 120 may desirably have a magnification in the range of about 1 to 100 times. The use of a microscope objective in focusing mechanism 120 may be particularly desirable for exemplary laser machining systems that use a single beam spot. Exemplary laser machining systems that use a mask to form multiple substantially parallel branches may also work well with microscope objectives or may use an array of microlenses with each microlens aligned in one of the branches of the beam path.

In the exemplary system of FIG. 2, which includes DOE 200, the optics of the focusing mechanism desirably include scan lens 202, which may preferably be a telecentric scan lens. Alternatively, an array of microlenses may be used with DOE 200 in the exemplary embodiment of FIG. 2. It is noted that it may be desirable for each of the microlenses in this alternative exemplary embodiment to be scan lenses.

Figure 4C:
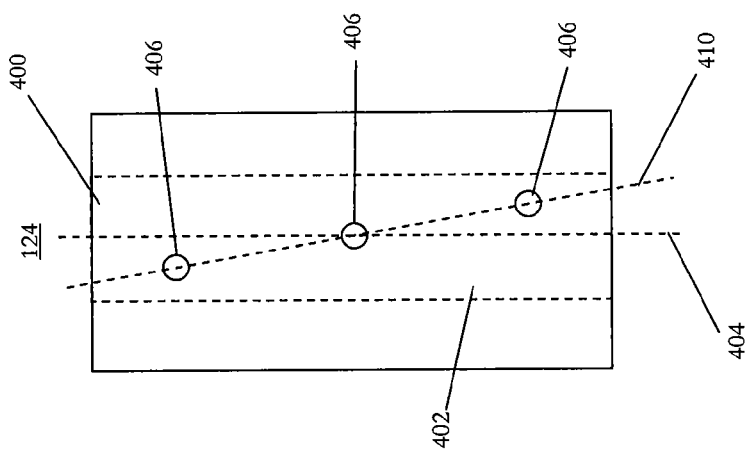
FIGS. 4B and 4C are side plan drawings (viewed in the beam path direction of an exemplary multiple branch ultrafast laser machining system according to the present invention) illustrating two alternative exemplary beam spot locations within an optical fiber.
Figure 4B:
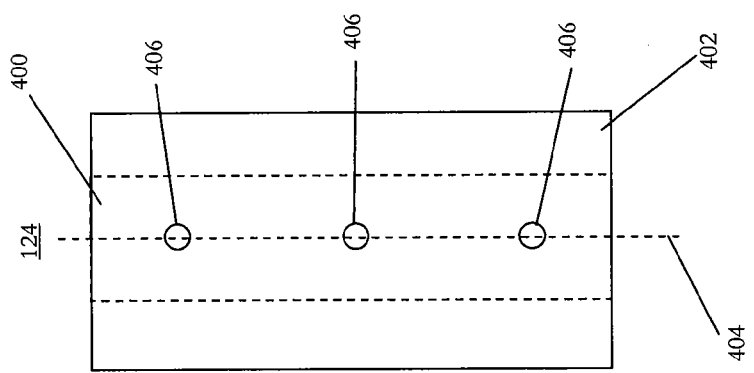
Figure 4A:
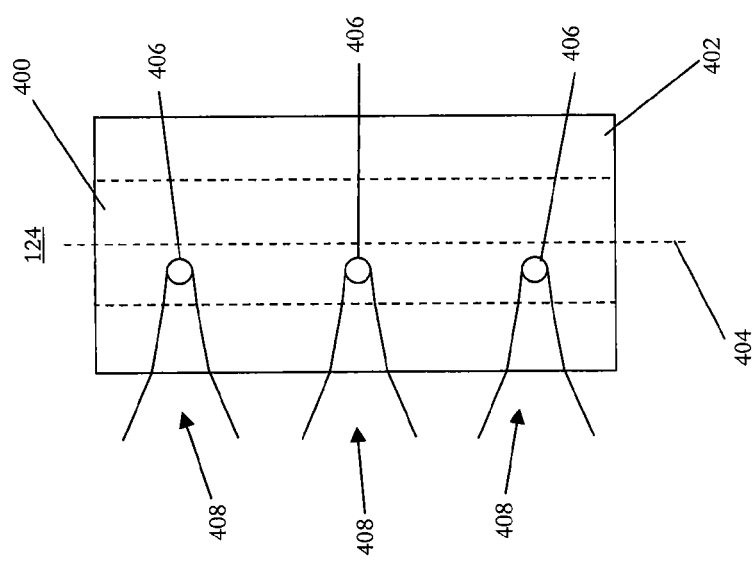
FIG. 4A is a side plan drawing (viewed in a direction perpendicular to the beam path of an exemplary multiple branch ultrafast laser machining system according to the present invention) illustrating exemplary beam spot locations within an optical fiber.

FIGS. 4A-C illustrate exemplary machining areas within optical fiber 124. FIG. 4A is a side view of optical fiber 124 in a direction perpendicular the direction of propagation of parallel branches 408. These three branches are focused through cladding layer 402 to beam spots 406 in fiber core 400. Focusing the three beam spots 406 of branches 408 to the same depth as shown in FIG. 4A may be desirable, but is not necessary. FIGS. 4B and 4C illustrate two exemplary arrangements of beam spots 406 as seen in the direction of propagation of branches 408 (i.e. perpendicular to FIG. 4A). In FIG. 4B the beam spots are aligned parallel to longitudinal axis 404 of optical fiber 124, while in FIG. 4C the beam spots are aligned line 410 which is tilted at an angle relative to longitudinal axis 404. It is noted that the use of three branches in FIG. 4A-C was selected for illustrative purposes only and is not meant to be limiting. It is also noted that, although beam spots 406 are all shown located in fiber core 400, branches 408 may also be focused in cladding layer 402 to modify the cladding layer in addition to or instead of fiber core 400.

Returning to FIGS. 1 and 2, a fiber mount holds and controllably moves optical fiber 124 such that the beam spot(s) may be aligned to target region 126 within the optical fiber. The fiber mount includes positioning apparatus 123 and fiber holder 122 which is coupled to positioning apparatus 123. Positioning apparatus 123 includes at least two linear motion stages. The first linear motion stage moves optical fiber 124 in a Z direction, substantially parallel to a direction of propagation of the pulses of laser light at the beam spot. The second linear translation stage moves the optical fiber in an X direction, which is substantially perpendicular to the direction of propagation of the pulses of laser light at the beam spot and substantially perpendicular to the longitudinal axis of optical fiber 124 at the beam spot. The Z direction is left-right in FIG. 4A and the X direction is left-right in FIGS. 4B and 4C. A third linear translation stage to move optical fiber 124 in a Y direction may also be desired, particularly for exemplary systems in which only one beam spot is used for machining the diffractive structure. The Y direction is substantially parallel to the longitudinal axis of optical fiber 124 at the beam spot, i.e. up-down in FIG. 4A-C. It is noted that, although optical fiber 124 is shown to be held in a vertical position by fiber holder 122 in FIGS. 1, 2, 3A, 3B, and 4A-C, it may be understood by one skilled in the art that optical fiber 124 may be held horizontally, or at any other angle, instead.

These linear translation stages may desirably be computer-controlled motion stages with micrometer resolution of a combined XY or XYZ motion stage (for example, a micron resolution XYZ motion stage manufactured by Burleigh). A computer-controlled, piezo-electric motion stage with nanometer-resolution (for example, a piezo-electric XY motion stage manufactured by Queensgate) may also be included. In such a combined translation stage, the computer-controlled motion stages may be used to align the beam spot of the exemplary laser machining system to target area 126 of optical fiber 124, with the micrometer resolution motion stages providing coarse positioning and the piezo-electric motion stages providing fine positioning.

Additionally the fiber mount may include a rotational stage coupled between the linear translation stages of positioning apparatus 123 and optical fiber 124 to rotate optical fiber 124 about its longitudinal axis at the beam spot. This rotational stage may be desirably coupled in such a manner as to rotate optical fiber 124 without rotating fiber holder 122. The rotational stage may desirably be a computer-controlled motion stage with degree resolution or better.

It may be understood by one skilled in the art that the order of several of the elements in the exemplary ultrafast laser machining systems of FIGS. 1 and 2 may be rearranged without altering the function of the system. For example: harmonic generating crystal 106 may be located before variable attenuator 104 and/or shutter 102; variable attenuator 104 may be located before shutter 102; polarization control means 110 may be located before dichroic mirror 108; and shutter 102 may be located anywhere along the beam path of the machining laser beam from its present position to immediately before focusing mechanism 120.

The exemplary systems of FIGS. 1 and 2 also include an imaging system to image the target region of the held optical fiber. These exemplary imaging systems desirably include a light source to illuminate target region 126 of held optical fiber 124 and two digital cameras aligned to image target region 126 from two substantially orthogonal directions to monitor the alignment of the ultrafast laser machining system and the progress of the processing. The use of two digital cameras at substantially orthogonal directions allows the operator to obtain a three dimensional view of target region 126 of optical fiber 124. This stereo view of target area 126 is desirable to properly locate the beam spot(s) within the optical fiber. Without the ability determine the three dimensional position of the material being machined within optical fiber 124 the manufacture of complex diffractive structures within optical fibers may be difficult. However, it is contemplated that many simpler diffractive structures may be formed with only a two dimensional view of target area 126.

FIGS. 1 and 2 each only show one of these digital cameras for simplicity. In both of these exemplary systems, the digital camera is shown to image target area 126 in parallel with optical beam 134 using the focusing mechanism as a lens for the camera. FIG. 1 illustrates light source 130 and digital camera 132 arranged to image target area 126 in reflection. Optical beam 136 of light from light source 130 is reflected by beam splitter 128 so that it passes through dichroic mirror 118 and focusing mechanism 120 to illuminate target area 126. Reflected optical beam 138 passes through focusing mechanism 120, dichroic mirror 118, and beam splitter 128 and is captured by digital camera 132. The imaging light from light source 130 may be substantially collimated by an included lens system (not separately shown). To reduce potential chromatic aberrations of this image, the imaging light desirably has a narrow spectrum. Thus, although it may be desirable for the light source to be a light emitting diode or a diode laser, a filtered broad spectrum light source may be used as well. Although the use of dichroic mirror 118 in FIG. 1 to combine the machining beam and the imaging beam requires that these light beams have different wavelengths, it may be desirable for the two light sources to have similar wavelengths so that focusing mechanism 120 may focus both beams similarly. Any difference between the focal lengths of the microscope objective at the illumination wavelength and the peak wavelength of laser source 100 may be compensated by the optics of digital camera 132 and/or additional optics between beam splitter 128 and digital camera 132 (not shown).

FIG. 2 illustrates light source 204 and digital camera 132 arranged to image target area 126 in transmission. Optical beam 206 of light from light source 204 directly illuminates target area 126 in the opposite direction of optical beam 134 of the laser pulses. Transmitted optical beam 138 passes through optical fiber 124, focusing mechanism 202, and dichroic mirror 118 and is captured by digital camera 132. It is noted that exemplary imaging systems in which one, or both, of the digital camera image the target area in transmission, as in FIGS. 2 and 3B, require optical fiber 124 to be held by fiber holder 122 such that there is a line of sight through target region 126 substantially perpendicular to the longitudinal axis of optical fiber 124.

Transmission imaging may be desirable to monitor the machined portions of the optical fiber to allow feedback control of positioning apparatus 123 during processing. This is because these index-altered regions may be easier to identify by differences in the light refracted by the machined portions seen during transmission imaging, as opposed to the differences in reflection off of the machined portions seen during reflection imaging. Alternatively, a combination of transmission and reflection imaging may be preferred. This may involve one digital camera the target area imaging in reflection while the other digital camera is imaging the target area in transmission, or it may involve both digital cameras imaging the target area in reflection and transmission sequentially by switching between different lighting elements for each viewing mode.

FIGS. 3A and 3B illustrate exemplary arrangements of digital cameras and light sources around fiber holder 122 that may used with exemplary embodiments of the present invention. FIG. 3A illustrates an exemplary imaging system in which both digital cameras 132 and 302 are arranged to image the target area of optical fiber 124 (viewed from above) in reflection. This exemplary arrangement uses only one light source for both digital cameras. The light source includes a single lighting element 300. This lighting element shines light along optical path 304 at a 45° angle to the orthogonal optical paths 138 and 306 viewed, respectively, by digital cameras 132 and 302.

FIG. 3B illustrates an exemplary imaging system in which digital camera 308 is arranged to image the target area of optical fiber 124 in reflection and digital camera 312 is arranged to image the target area in transmission. It is noted that neither digital camera in this exemplary arrangement is aligned to view along an optical path collinear to optical path 134. Also, this exemplary arrangement uses one lighting element for each digital camera. Lighting element 316 shines light along optical path 320 off of beam splitter 318 to illuminate the target area of optical fiber 124. A portion of the light is reflected back along optical path 310 to be viewed by digital camera 308. Lighting element 322 shines light along optical path 324 to illuminate the target area. At least a portion of this light is through optical fiber 124 along optical path 314 to be viewed by digital camera 312.

It is noted that the various exemplary arrangements of the digital cameras and lighting elements in FIGS. 1, 2, 3A, and 3B are not exhaustive. Also, one skilled in the art may understand that these exemplary arrangements of the digital cameras and lighting elements may be combined to form additional exemplary arrangements.

Figure 7A:
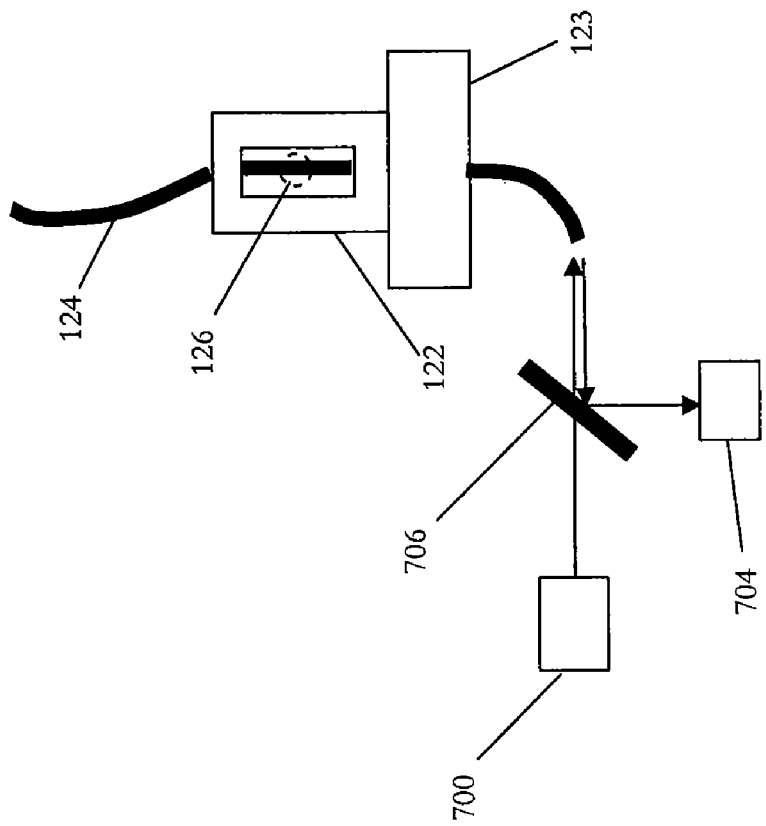
FIGS. 7A and 7B are schematic block diagrams illustrating exemplary in situ fiber monitors according to the present invention.
Figure 7B:
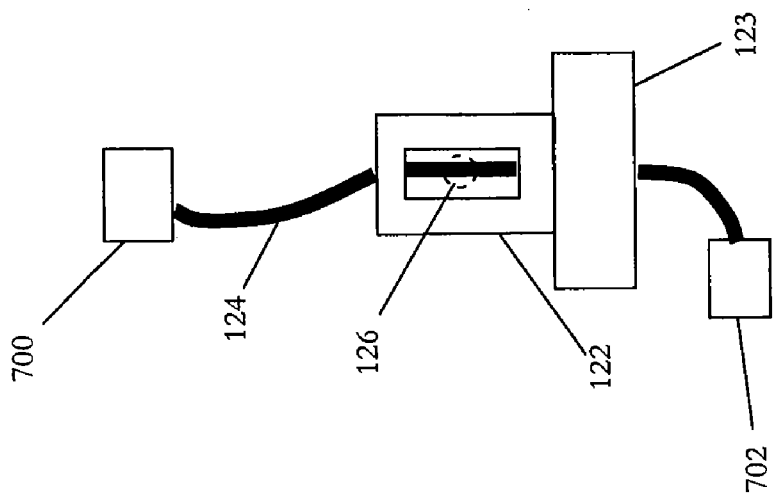

An exemplary ultrafast laser machining system that may be used with exemplary methods of the present invention may also include an exemplary in situ fiber monitor, such as those shown in FIGS. 7A and 7B, to measure properties of the diffractive structure during machining. The exemplary in situ fiber monitor may include fiber coupled light source 700 optically coupled to one end of optical fiber 124 and may include one or more optical detectors 702 and/or 704 optically coupled to optical fiber 124. The optical detector(s) may include optical reflection detector 704 optically coupled to the same end of the optical fiber as fiber coupled light source 700 via a means such as beam splitter 706, as shown in FIG. 7B, and/or optical transmission detector 702 optically coupled to the other end of the optical fiber as shown in FIG. 7A. If fiber coupled light source 700 is a narrow bandwidth light source the optical detector(s) may detect the total optical power of the light transmitted, or reflected, by the diffractive structure. If a broad bandwidth light source is used, the optical detector(s) may be used to detect the optical power spectrum of the light transmitted, or reflected, by the diffractive structure.

Alternatively, in situ fiber monitoring may involve using one, or both, of the digital cameras to image light from the fiber coupled light source scattered by a portion of the diffractive structure during formation of the diffractive structure.

Figure 5:
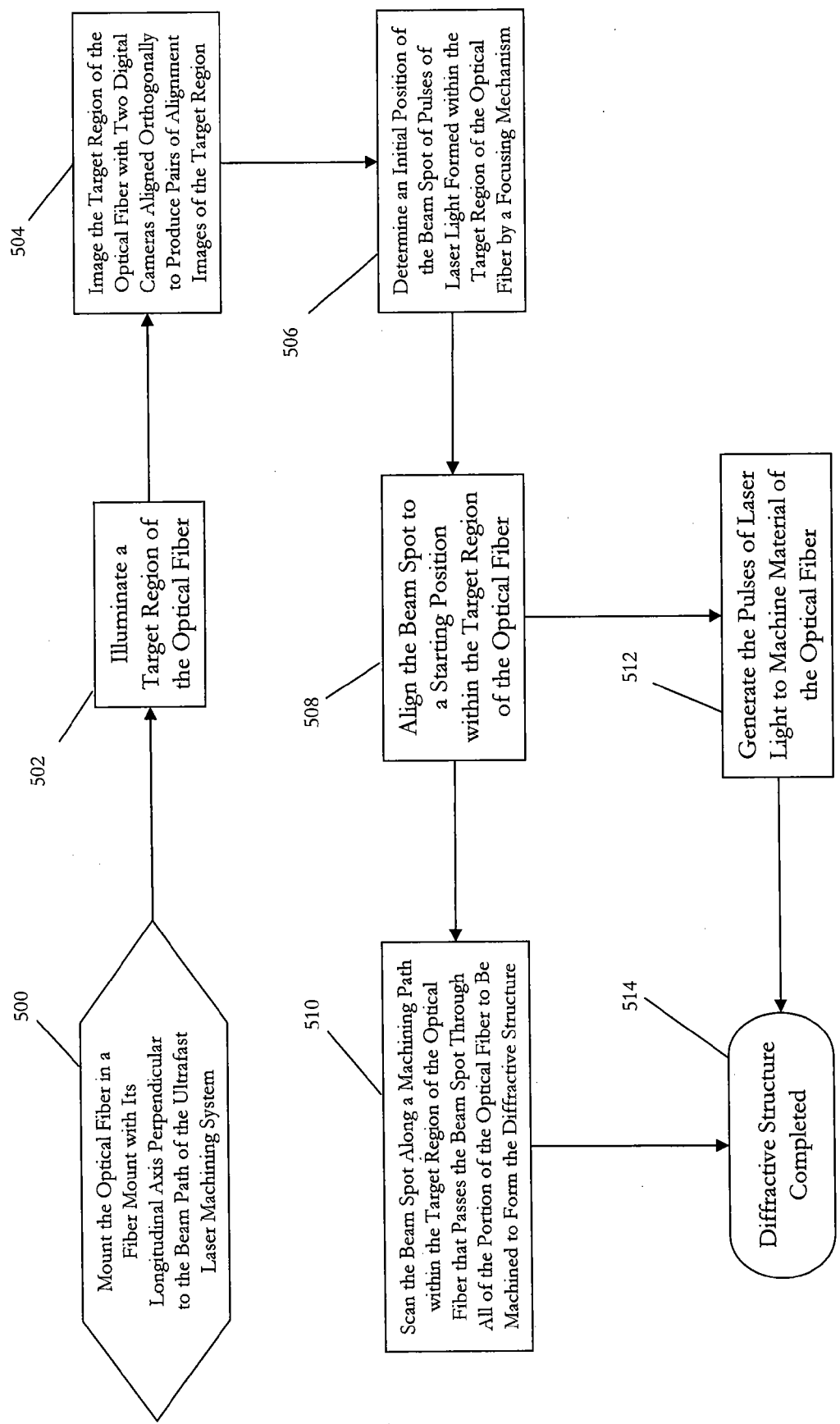
FIG. 5 is a flowchart illustrating an exemplary method of laser machining a diffractive structure in an optical fiber according to the present invention.

FIG. 5 illustrates an exemplary method of forming a diffractive structure in an optical fiber using an ultrafast laser machining system, such as the exemplary system of FIG. 1. The diffractive structure formed within the optical fiber may include one or more Bragg grating structures, photonic crystals, or diffractive lenses.

The optical fiber is mounted in a fiber mount of the ultrafast laser machining system, step 500. The optical fiber is mounted such that the longitudinal axis of the optical fiber is perpendicular to the beam path of the pulses of laser light of the ultrafast laser machining system.

The target region of the optical fiber is illuminated with an illumination light, step 502. The target region may be illuminated by light sources as illustrated in FIGS. 2A and 2B such that at least one of the two digital camera digital cameras images the target region of the optical fiber in reflection and/or at least one of the two digital camera digital cameras images the target region of the optical fiber in transmission. The light source may include an element aligned to illuminate the target region of the optical fiber through the focusing mechanism of the ultrafast laser machining system, as shown in FIG. 2B (lighting element 222). Alternatively, the target area may be illuminated by scattered light from an in situ monitor. In this alternative embodiment, light is coupled into the optical fiber and scattered off of partially machined sections of the diffractive structure to illuminate the target region of the optical fiber. It is noted that this alternative illumination method may be more desirable for producing alignment images to monitor progress of the diffractive structure than to determine the initial beam spot position.

The target region of the optical fiber is imaged with two digital cameras aligned in substantially orthogonal directions, step 504. This produces pairs of substantially orthogonal alignment images of the target region of the optical fiber that may be used to accurately identify a location of diffractive structures in three dimensions, and possibly the beam spot, within the optical fiber. As shown in FIGS. 1 and 2B, one of the digital cameras may be aligned to image the target region through the focusing mechanism. It is noted that it may be desirable for the two digital cameras to be aligned along the axes of two of the linear translation stages in the positioning apparatus of the ultrafast laser machining system. This exemplary alignment may simplify calculations relating to the alignment of the beam spot within the optical fiber.

The initial position of the beam spot within the target region of the optical fiber is determined, step 506. A number of exemplary methods may be use to determine this location. If the positioning apparatus and the fiber holder have been precalibrated, this determination may be trivial, merely involving reading the setting of the motion stages in the positioning apparatus. If these component have not been precalibrated, or do not have the desired accuracy, direct measurements using the alignment images may be used.

If the light source is aligned to illuminate the target region through the focusing mechanism, an illumination spot is formed by the light source. This illumination spot and the beam spot of the laser pulses are separated by a predetermined distance based on their respective peak wavelengths. The optical fiber may be moved along the propagation axis of the laser pulses and the illumination light until the illumination spot is focused on a surface of the optical fiber, as seen using the pairs of substantially orthogonal alignment images of the target region of the optical fiber. This position, called the initial fiber position, may then be used to determine the initial position of the beam spot within the target region based on the predetermined distance between the illumination spot and the beam spot.

Alternatively, the pairs of substantially orthogonal alignment images may be used to directly image the beam path of the laser pulses through the optical fiber. In this alternative embodiment, it is desirable to generate a number of alignment pulses of laser light, which have a pulse energy less than a machining pulse energy. This lower pulse energy protects the material of the optical fiber from being prematurely machined during alignment. Scattered light from the alignment pulses is imaged with the two digital cameras and the initial position of the beam spot is determined based on the resulting initial pair of substantially orthogonal alignment images.

Once the initial position of the beam spot is known, the beam spot is aligned to a starting position within the target region of the optical fiber, step 508. The starting position is desirably within the portion of the optical fiber that is to be machined to form the diffractive structure. Additionally, the starting position is desirably the point within the portion to be machined for which the beam path of the laser pulses must pass through the greatest length of optical fiber material to reach the beam spot. If more than one point fits the criteria of the starting position, then any of these points may be selected. This point is desirably selected because the laser pulses propagate differently through the machined portions of the optical fiber material. This means that it is easier to predict the behavior of the laser pulses when they only transmitted through unmachined optical fiber material. Therefore, it is desirable to begin at the back of the fiber (i.e. the point farthest from the focusing mechanism) and work forward (or to begin at the center and work out).

Alternatively, the starting position may be located at one side of the optical fiber and the machining may progress from that side to the other. This starting position is the point, with the portion to be machined, which is farthest from a plane that is parallel to the beam path of the laser pulses and that passes through the longitudinal axis of the optical fiber.

The beam spot is scanned along a machining path within the target region of the optical fiber, step 510, as the pulses of laser light are generated to machine the optical fiber material, step 512. The pulses of laser light desirably have a duration of less than about 1 ns. The laser pulses are desirably focused to the beam spot with the focusing mechanism and their pulse energy is controlled such that the fluence of light in the beam spot exceeds a machining fluence level of the optical fiber within region that has a predetermined machining volume. The size of this machining volume depends on the feature size needed to form the diffractive structure. Fine features may be desirable, but the use of smaller machining volumes increases the number of laser pulses needed to machine the diffractive structure. These competing issues may lead to tradeoffs in the selection of the machining volume desired. Machining volumes are typically greater than about 0.001 $\mu m^3$, and may often exceed about 125 $\mu m^3$. Also, it is noted that the use of non-circularly polarized light may alter the shape of the regions machined by individual laser pulses. Therefore, it may be desirable to control the polarization of the pulses of laser light incident on the target region of the optical fiber.

As noted in above with regard to step 508, it is desirable that the laser pulse only pass through unmachined optical fiber material. Therefore, the machining path is designed to pass the beam spot through all of the portion of the optical fiber to be machined such that the beam path of the plurality of pulses of laser light does not pass through previously machined material of the optical fiber.

During scanning of the beam spot along the machining path, the pulses of laser light are desirably generated at a constant repetition rate by the ultrafast laser machining system. Also it is desirable for the pulse energy of the laser pulses and the size of the beam spot to which they are focused to remain substantially constant, so that the machining volume is substantially constant. The beam spot may also desirably be scanned through the material of the optical fiber with a constant scan rate. It is desirable to select the constant scan rate, the repetition rate, and the machining volume such that a machined portion of the material of the optical fiber that is machined by one pulse of the plurality of pulses of laser light spatially overlaps with a previously machined portion of the material machined by a directly preceding pulse of the plurality of pulses of laser light. The selection of these parameters is desirable to allow complete machining of the diffractive structure.

The machining path may either be designed such that the beam spot remains within the portion of the optical fiber to be machined, or such that the beam spot is scanned through a larger region of the optical fiber that includes the portion to be machined. The second type of machining path may simplify control of the positioning apparatus needed to perform the scanning, but it means that a shutter may be needed to transmit or block transmission of the laser pulses depending on whether the beam spot is within the portion of the optical fiber to be machined or not.

Which ever method is used, it may be desirable to control the position of the beam spot within the target region of the optical fiber with an accuracy of less than about 100 nm during scanning to improve the quality of the diffractive structure, although it is noted that for diffractive structures designed for longer wavelengths lower tolerances may be used without any appreciable effect.

If the starting position is located at the back of the optical fiber or at one side of the optical fiber, a raster scan pattern may be used to scan the beam spot through the portion of the optical fiber to be machined. Using this pattern, the beam spot is raster scanned over a cross-sectional plane of the optical fiber beginning at the starting point in a series of scan lines. If the starting position is at the back of the optical fiber, then the scan lines are perpendicular to the beam path of the laser pulses and the scanning may be performed in one direction along the scan lines or in both. If the starting position is on one side of the optical fiber, then the scan lines are parallel to the beam path of the laser pulses and the scanning is desirably performed along the scan lines from back to front. Once a raster scan of the current cross-sectional plane is completed the optical fiber may be moved to step the cross-sectional plane to a new position along the longitudinal axis of the optical fiber. The beam spot is then returned to the starting position in the cross-sectional plane and the raster scanning of the beam spot repeated for the new cross-sectional plane. This scanning and stepping process continues until the diffractive structure has been completed, step 514.

If the starting position is located at the center of the optical fiber, a circular scan pattern may be used to scan the beam spot through the portion of the optical fiber to be machined. Using this pattern, the beam spot is scanned over a cross-sectional plane of the optical fiber beginning at the starting point in a series of scan circles. Once a circle around the longitudinal axis of the optical fiber is completed, the optical fiber may be stepped along a radial axis perpendicular to the longitudinal axis of the optical fiber. This continues until the outermost circle of the current cross-sectional plane is completed. The optical fiber may then be moved to step the cross-sectional plane to a new position along the longitudinal axis of the optical fiber. The beam spot is returned to the starting position in the cross-sectional plane and the beam spot through a new set of circles on this new cross-sectional plane. This scanning and stepping process continues until the diffractive structure has been completed, step 514.

It is noted that the pairs of substantially orthogonal alignment images of the target region of the optical fiber may be monitored during step 510 and 512 to provide feedback control of the positioning apparatus of the ultrafast laser machining system. This feedback control may be desirable to improve the accuracy of scanning the beam spot along the machining path and, thus improve the quality of the resulting diffractive structure.

Additionally, an in situ monitor may be used as part of step 514 to determine when the diffractive structure is complete. In this alternative embodiment, light is coupled into the optical fiber which has a predetermined coupled power level. Either a portion of the coupled light that is reflected by partially machined sections of the diffractive structure or a portion of the coupled light that is transmitted through the optical fiber (or both) is detected. The diffractive structure is determined to be complete when the detected light is substantially equal to a predetermined power level.

Figure 6:
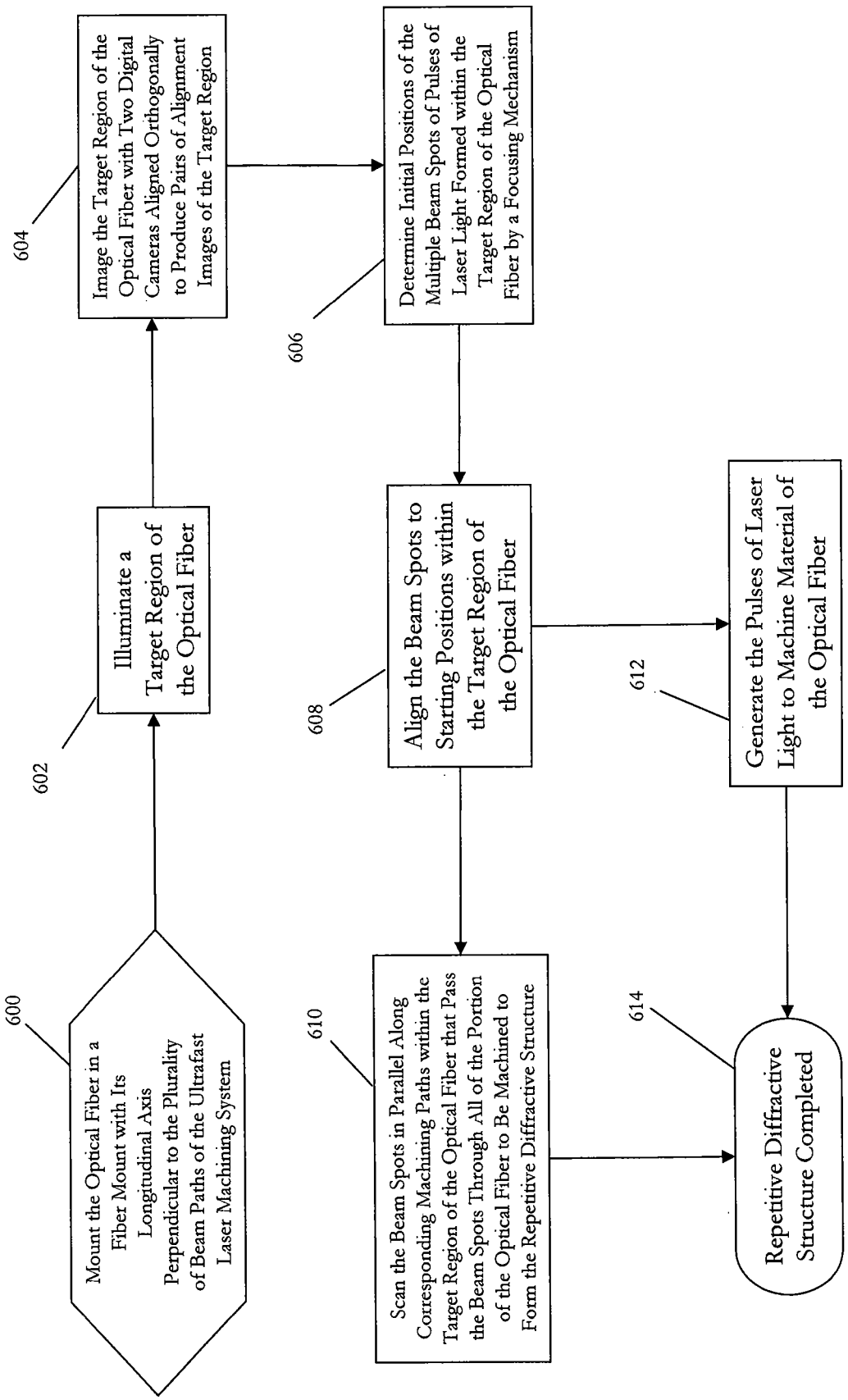
FIG. 6 is a flowchart illustrating an exemplary method of laser machining a repetitive diffractive structure in an optical fiber according to the present invention.

FIG. 6 illustrates an exemplary method of forming a repetitive diffractive structure in an optical fiber using an ultrafast laser machining system with a plurality of parallel processing beam paths, or branches. This exemplary method is similar to the exemplary method of FIG. 5. It is noted that the diffractive structures created by the exemplary method of FIG. 6 are necessarily repetitive. If the parallel processing beam paths are substantially equally spaced in the direction of the longitudinal axis of the optical fiber, then the repetitive diffractive structure is a periodic diffractive structure, but in the parallel processing beam paths are not substantially equally spaced the resulting diffractive structure is not necessarily periodic.

The optical fiber is mounted in a fiber mount of the ultrafast laser machining system, step 600. The optical fiber is mounted such that the longitudinal axis of the optical fiber is perpendicular to the parallel processing beam paths of the pulses of laser light of the ultrafast laser machining system.

As in the exemplary method of FIG. 5, the target region of the optical fiber is illuminated with an illumination light, step 602, and the target region of the optical fiber is imaged with two digital cameras aligned in substantially orthogonal directions, step 504.

The initial positions, within the target region of the optical fiber, of the beam spot corresponding to the plurality of parallel processing beam paths are determined, step 606. The relative positions of the beam spot are desirably known. Therefore, the determination of one initial beam spot position may be used to determine the others. As in the exemplary method of FIG. 4, a number of exemplary methods may be use to determine this location.

Once the initial positions of the beam spots are known, the beam spots are each aligned to a starting position within the target region of the optical fiber, step 608. Again because the relative positions of the beams spots are desirably known aligning one beam spot to its initial position should align all of the beam spots.

The beam spots are scanned in parallel along machining paths within the target region of the optical fiber, step 610, as the pulses of laser light are generated and transmitted down the multiple parallel processing beam paths to machine the optical fiber material, step 612. Each machining path is designed to pass the corresponding beam spot through all of the portion of the optical fiber to be machined by that beam spot to form the corresponding section of the plurality of sections of the repetitive diffractive structure. It is noted that the machining paths are also desirably designed such that none of the parallel processing beam paths passes through previously machined material of the optical fiber, whether the material was machined by the beam spot corresponding that parallel processing beam path or another parallel processing beam path.

The scanning process continues until the machining paths are completed and the repetitive diffractive structure is finished, step 614. It is noted that for certain repetitive diffractive structures, such as Bragg grating structures with hundreds of periods or more, it may be desirable for the machining paths to scan the multiple beam spots through a pattern such that each beam spot forms one period of the grating. This forms a grating structure with a number of periods equal to the number of parallel processing beam paths. Because the number of parallel processing beam paths is likely to be significantly less than the number of periods desired in the grating structure, the fiber is moved along its longitudinal axis to an unmachined portion of the fiber adjacent to the previously machined grating structure and the machining paths repeated so that another set of grating periods is formed. This process may be repeated until the desired number of grating periods has been formed.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed is:

1. A method to form a diffractive structure in an optical fiber using an ultrafast laser machining system, the method comprising the steps of:
   a) mounting the optical fiber in a fiber mount of the ultrafast laser machining system with a longitudinal axis of the optical fiber perpendicular to a beam path of a plurality of pulses of laser light of the ultrafast laser machining system;
   b) illuminating a target region of the optical fiber with illumination light;
   c) imaging the target region of the optical fiber with two digital cameras aligned in substantially orthogonal directions to produce pairs of substantially orthogonal alignment images of the target region of the optical fiber;
   d) determining an initial position of a beam spot of the plurality of pulses of laser light formed by a focusing mechanism of the ultrafast laser machining system within the target region of the optical fiber;
   e) aligning the beam spot to a starting position within the target region of the optical fiber, the starting position being within a portion of the optical fiber to be machined to form the diffractive structure for which the beam path of the plurality of pulses of laser light passes through a greatest length of material of the optical fiber to reach the beam spot;
   f) scanning the beam spot along a machining path within the target region of the optical fiber, the machining path designed to pass the beam spot through all of the portion of the optical fiber to be machined to form the diffractive structure such that the beam path of the plurality of pulses of laser light does not pass through previously machined material of the optical fiber; and
   g) generating the plurality of pulses of laser light having a duration of less than about 1 ns to machine material of the optical fiber as the beam spot is scanned in step (f), thereby forming the diffractive structure within the optical fiber.

2. The method according to claim 1, wherein step (b) includes illuminating the target region of the optical fiber such that at least one of the two digital cameras images the target region of the optical fiber in reflection in step (c).

3. The method according to claim 1, wherein step (b) includes illuminating the target region of the optical fiber such that at least one of the two digital camera digital cameras images the target region of the optical fiber in transmission in step (c).

4. The method according to claim 1, wherein step (b) includes the steps of:
   b1) coupling light into the optical fiber; and
   b2) scattering the coupled light off of partially machined sections of the diffractive structure to illuminate the target region of the optical fiber.

5. The method according to claim 1, wherein step (b) includes illuminating the target region of the optical fiber using a light source aligned to illuminate the target region of the optical fiber through the focusing mechanism of the ultrafast laser machining system.

6. The method according to claim 5, wherein:
   an illumination spot is formed by the light source a predetermined distance from the beam spot of the plurality of pulses of laser light; and
   step (d) includes the steps of:
   d1) moving the optical fiber along a propagation axis of the pulses of laser light;
   d2) determining an initial fiber position in which the illumination spot is focused on a surface of the optical fiber using the pairs of substantially orthogonal alignment images of the target region of the optical fiber; and
   d3) determining the initial position of the beam spot within the target region of the optical fiber in the initial fiber position based on the predetermined distance between the illumination spot and the beam spot.

7. The method according to claim 1, wherein one image of each pair of substantially orthogonal alignment images of the target region of the optical fiber is produced by a digital camera aligned to image the target region of the optical fiber through the focusing mechanism of the ultrafast laser machining system.

8. The method according to claim 1, wherein step (d) includes the steps of:
   d1) generating a plurality of alignment pulses of laser light having a pulse energy less than a machining pulse energy;
   d2) imaging scattered light of the plurality of alignment pulses of laser light from the material of the target region of the optical fiber with the two digital cameras to produce an initial pair of substantially orthogonal alignment images of the target region of the optical fiber; and
   d3) determining the initial position of the beam spot within the target region of the optical fiber based on the initial pair of substantially orthogonal alignment images.

9. The method according to claim 1, wherein step (d) includes determining the initial position of the beam spot within the target region of the optical fiber based on precalibration of the ultrafast laser machining system.

10. The method according to claim 1, wherein:
    the starting position is selected to be a point within the portion of the optical fiber to be machined that is farthest from the focusing mechanism of the ultrafast laser machining system;
    step (e) includes moving the beam spot from the initial position to the starting position by linearly translating the optical fiber along at least one axis; and
    step (f) includes scanning the beam spot along the machining path by linearly translating the optical fiber along at least one axis.

11. The method according to claim 10, wherein:
    step (f) includes the steps of:
      f1) raster scanning the beam spot over a cross-sectional plane of the optical fiber beginning at the starting point in scan lines perpendicular to the beam path of the plurality of pulses of laser light;
      f2) stepping the cross-sectional plane along the longitudinal axis of the optical fiber when a raster scan of the cross-sectional plane is completed;
      f3) returning the beam spot to the starting position in the cross-sectional plane;
      f4) repeating steps (f1), (f2), and (f3) until the diffractive structure is machined;
    step (g) includes the steps of:
      g1) transmitting a subset of the plurality of pulses of laser light to machine the material of the optical fiber when the beam spot is aligned within the portion of the optical fiber to be machined to form the diffractive structure; and
      g2) blocking other pulses of the plurality of pulses of laser light when the beam spot is not aligned within the portion of the optical fiber to be machined to form the diffractive structure.

12. The method according to claim 1, wherein:
    the starting position is selected to be a point within the portion of the optical fiber to be machined that is farthest from a plane that is parallel to the beam path of the plurality of pulses of laser light and that passes through the longitudinal axis of the optical fiber;
    step (e) includes moving the beam spot from the initial position to the starting position by linearly translating the optical fiber along at least one axis; and
    step (f) includes scanning the beam spot along the machining path by linearly translating the optical fiber along at least one axis.

13. The method according to claim 12, wherein:
    step (f) includes the steps of:
      f1) raster scanning the beam spot over a cross-sectional plane of the optical fiber beginning at the starting point in scan lines parallel to the beam path of the plurality of pulses of laser light;
      f2) stepping the cross-sectional plane along the longitudinal axis of the optical fiber when a raster scan of the cross-sectional plane is completed;
      f3) returning the beam spot to the starting position in the cross-sectional plane;
      f4) repeating steps (f1), (f2), and (f3) until the diffractive structure is machined;
    step (g) includes the steps of:
      g1) transmitting a subset of the plurality of pulses of laser light to machine the material of the optical fiber when the beam spot is aligned within the portion of the optical fiber to be machined to form the diffractive structure; and
      g2) blocking other pulses of the plurality of pulses of laser light when the beam spot is not aligned within the portion of the optical fiber to be machined to form the diffractive structure.

14. The method according to claim 1, wherein:
    the starting position is selected to be a point within the portion of the optical fiber to be machined that is nearest to the longitudinal axis of the optical fiber;
    step (e) includes moving the beam spot from the initial position to the starting position by linearly translating the optical fiber along at least one axis; and
    step (f) includes scanning the beam spot along the machining path by rotating the optical fiber about the longitudinal axis of the optical fiber.

15. The method according to claim 14, wherein step (f) further includes scanning the beam spot along the machining path by linearly translating the optical fiber along at least one axis.

16. The method according to claim 15, wherein:
    step (f) includes the steps of:
      f1) scanning the beam spot along circles on a cross-sectional plane of the optical fiber beginning at the starting point by rotating the optical fiber about the longitudinal axis of the optical fiber;
      f2) stepping the optical fiber along a radial axis perpendicular to the longitudinal axis of the optical fiber when a circle of the cross-sectional plane is completed;
      f3) stepping the cross-sectional plane along the longitudinal axis of the optical fiber when a scan of the cross-sectional plane is completed;
      f4) returning the beam spot to the starting position in the cross-sectional plane;
      f5) repeating steps (f1), (f2), (f3), and (f4) until the diffractive structure is machined;
    step (g) includes the steps of:
      g1) transmitting a subset of the plurality of pulses of laser light to machine the material of the optical fiber when the beam spot is aligned within the portion of the optical fiber to be machined to form the diffractive structure; and g2) blocking other pulses of the plurality of pulses of laser light when the beam spot is not aligned within the portion of the optical fiber to be machined to form the diffractive structure.

17. The method according to claim 1, wherein steps (e) and (f) include the step of controlling a position of the beam spot within the target region of the optical fiber with an accuracy of less than about 100 nm.

18. The method according to claim 1, wherein:
step (f) includes scanning the beam spot along the machining path at a constant scan rate;
step (g) includes the steps of:
g1) generating the plurality of pulses of laser light at a repetition rate; and
g2) focusing the plurality of pulses of laser light to the beam spot with the focusing mechanism and controlling a pulse energy of the plurality of pulses of laser light such that a fluence of light in the beam spot exceeds a machining fluence within a machining volume; and
at least one of the constant scan rate, the repetition rate, or the machining volume is selected such that a machined portion of the material of the optical fiber that is machined by one pulse of the plurality of pulses of laser light spatially overlaps with a previously machined portion of the material machined by a directly preceding pulse of the plurality of pulses of laser light.

19. The method according to claim 1, wherein step (g) includes the step of focusing the plurality of pulses of laser light to the beam spot with the focusing mechanism and controlling a pulse energy of the pulses of laser light such that a fluence of light in the beam spot exceeds a machining fluence within a predetermined machining volume.

20. The method according to claim 19, wherein the predetermined machining volume is greater than about 0.001 $\mu m^3$.

21. The method according to claim 19, wherein the predetermined machining volume is greater than about 125 $\mu m^3$.

22. The method according to claim 1, wherein step (g) further includes the step of controlling a polarization of the plurality of pulses of laser light incident on the target region of the optical fiber.

23. The method according to claim 1, further comprising the step of:
h) monitoring the pairs of substantially orthogonal alignment images of the target region of the optical fiber to provide feedback control of a positioning apparatus of the ultrafast laser machining system to improve accuracy of scanning the beam spot along the machining path in step (f).

24. The method according to claim 1, further comprising the step of:
h) coupling light into the optical fiber having a predetermined coupled power level; and
i) detecting a reflected portion of the coupled light reflected by partially machined sections of the diffractive structure; and
j) determining that machining of the diffractive structure is complete when the reflected portion of the coupled light is substantially equal to a predetermined reflected power level.

25. The method according to claim 1, further comprising the step of:
h) coupling light into the optical fiber having a predetermined coupled power level; and
i) detecting a transmitted portion of the coupled light transmitted through the optical fiber; and
j) determining that machining of the diffractive structure is complete when the transmitted portion of the coupled light is substantially equal to a predetermined transmitted power level.

26. The method according to claim 1, wherein the diffractive structure includes at least one of a Bragg grating structure, a photonic crystal, or a diffractive lens.

27. A method to form a repetitive diffractive structure in an optical fiber using an ultrafast laser machining system with a plurality of parallel processing beam paths, the method comprising the steps of:
a) mounting the optical fiber in a fiber mount of the ultrafast laser machining system with a longitudinal axis of the optical fiber perpendicular to the plurality of parallel processing beam paths of the ultrafast laser machining system;
b) illuminating a target region of the optical fiber with illumination light;
c) imaging the target region of the optical fiber with two digital cameras aligned in substantially orthogonal directions to produce pairs of substantially orthogonal alignment images of the target region of the optical fiber;
d) determining initial positions of a plurality of beam spots of a plurality of pulses of laser light formed by a focusing mechanism of the ultrafast laser machining system within the target region of the optical fiber, each of the plurality of beam spots corresponding to one of the plurality of parallel processing beam paths of the ultrafast laser machining system;
e) aligning each beam spot of the plurality of beam spots to one of a plurality of starting positions within in the target region of the optical fiber, each starting position being within a portion of the optical fiber to be machined to form one of a plurality of sections of the repetitive diffractive structure for which a corresponding beam path of the plurality of parallel processing beam paths passes through a greatest length of material of the optical fiber to reach the beam spot;
f) scanning each beam spot in parallel along one of a plurality of machining paths within the target region of the optical fiber, each machining path designed to pass the corresponding beam spot through all of the portion of the optical fiber to be machined to form the corresponding section of the plurality of sections of the repetitive diffractive structure such that none of the plurality of parallel processing beam paths passes through previously machined material of the optical fiber; and
g) generating the plurality of pulses of laser light having a duration of less than about 1 ns to machine material of the optical fiber as the plurality of parallel processing beam paths are scanned in parallel in step (f), thereby forming the repetitive diffractive structure within the optical fiber.

28. The method according to claim 27, wherein:
the plurality of starting positions are selected to be points within the portion of the optical fiber to be machined that are farthest from the focusing mechanism of the ultrafast laser machining system, each starting position being within one of the plurality of sections of the repetitive diffractive structure;
step (e) includes moving the plurality of beam spots from the plurality of initial positions to the plurality of starting positions in parallel by linearly translating the optical fiber along at least one axis; and
step (f) includes scanning the plurality of beam spots in parallel along the plurality of machining paths by linearly translating the optical fiber along at least one axis.

29. The method according to claim 28, wherein:
step (f) includes the steps of:
- f1) raster scanning the plurality of beam spots over a plurality of cross-sectional planes of the optical fiber beginning at the plurality of starting points in scan lines perpendicular to the plurality of parallel processing beam paths of the plurality of pulses of laser light;
- f2) stepping the plurality of cross-sectional planes along the longitudinal axis of the optical fiber when raster scans of the plurality of cross-sectional planes are completed;
- f3) returning the plurality of beam spots to the plurality of starting positions in the plurality of cross-sectional planes;
- f4) repeating steps (f1), (f2), and (f3) until the repetitive diffractive structure is machined;

step (g) includes the steps of:
- g1) transmitting a subset of the plurality of pulses of laser light to machine the material of the optical fiber when the plurality of beam spots are aligned within the portion of the optical fiber to be machined to form the repetitive diffractive structure; and
- g2) blocking other pulses of the plurality of pulses of laser light when the plurality of beam spots are not aligned within the portion of the optical fiber to be machined to form the repetitive diffractive structure.

30. The method according to claim 27, wherein:
the plurality of starting positions are selected to be points within the portion of the optical fiber to be machined that are farthest from a plane that is parallel to the plurality of parallel processing beam paths of the plurality of pulses of laser light and that passes through the longitudinal axis of the optical fiber;
step (e) includes moving the plurality of beam spots from the plurality of initial positions to the plurality of starting positions in parallel by linearly translating the optical fiber along at least one axis; and
step (f) includes scanning the plurality of beam spots in parallel along the plurality of machining paths by linearly translating the optical fiber along at least one axis.

31. The method according to claim 30, wherein:
step (f) includes the steps of:
- f1) raster scanning the plurality of beam spots over a plurality of cross-sectional planes of the optical fiber beginning at the plurality of starting points in scan lines parallel to the plurality of parallel processing beam paths of the plurality of pulses of laser light;
- f2) stepping the plurality of cross-sectional planes along the longitudinal axis of the optical fiber when raster scans of the plurality of cross-sectional planes are completed;
- f3) returning the plurality of beam spots to the plurality of starting positions in the plurality of cross-sectional planes;
- f4) repeating steps (f1), (f2), and (f3) until the repetitive diffractive structure is machined;

step (g) includes the steps of:
- g1) transmitting a subset of the plurality of pulses of laser light to machine the material of the optical fiber when the plurality of beam spots are aligned within the portion of the optical fiber to be machined to form the repetitive diffractive structure; and
- g2) blocking other pulses of the plurality of pulses of laser light when the plurality of beam spots are not aligned within the portion of the optical fiber to be machined to form the repetitive diffractive structure.

32. The method according to claim 27, wherein:
the plurality of starting positions are selected to be points within the portion of the optical fiber to be machined that are nearest to the longitudinal axis of the optical fiber;
step (e) includes moving the plurality of beam spots from the plurality of initial positions to the plurality of starting positions in parallel by linearly translating the optical fiber along at least one axis; and
step (f) includes scanning the plurality of beam spots in parallel along the plurality of machining paths by rotating the optical fiber about the longitudinal axis of the optical fiber.

33. The method according to claim 32, wherein step (f) further includes scanning the plurality of beam spots in parallel along the plurality of machining paths by linearly translating the optical fiber along at least one axis.

34. The method according to claim 33, wherein:
step (f) includes the steps of:
- f1) scanning the plurality of beam spots along circles on a plurality of cross-sectional planes of the optical fiber beginning at the plurality of starting points by rotating the optical fiber about the longitudinal axis of the optical fiber;
- f2) stepping the optical fiber along a radial axis perpendicular to the longitudinal axis of the optical fiber when a circle of the plurality of cross-sectional planes is completed;
- f3) stepping the plurality of cross-sectional planes along the longitudinal axis of the optical fiber when scans of the plurality of cross-sectional planes are completed;
- f4) returning the plurality of beam spots to the plurality of starting positions in the plurality of cross-sectional planes;
- f5) repeating steps (f1), (f2), (f3), and (f4) until the repetitive diffractive structure is machined;

step (g) includes the steps of:
- g1) transmitting a subset of the plurality of pulses of laser light to machine the material of the optical fiber when the plurality of beam spots are aligned within the portion of the optical fiber to be machined to form the repetitive diffractive structure; and
- g2) blocking other pulses of the plurality of pulses of laser light when the plurality of beam spots are not aligned within the portion of the optical fiber to be machined to form the repetitive diffractive structure.

35. The method according to claim 27, wherein steps (e) and (f) include the step of controlling positions of the plurality of beam spot within the target region of the optical fiber with an accuracy of less than about 100 nm.

36. The method according to claim 27, wherein step (g) includes the step of focusing the plurality of pulses of laser light to the plurality of beam spot with the focusing mechanism and controlling a pulse energy of the pulses of laser light such that a fluence of light in each of the plurality of beam spots exceeds a machining fluence within a predetermined machining volume.

37. The method according to claim 36, wherein the predetermined machining volume is greater than about 0.001 $\mu m^3$.

38. The method according to claim 36, wherein the predetermined machining volume is greater than about 125 $\mu m^3$.

39. The method according to claim 27, further comprising the step of:
- h) monitoring the pairs of substantially orthogonal alignment images of the target region of the optical fiber to provide feedback control of a positioning apparatus of the ultrafast laser machining system to improve accuracy of scanning the plurality of beam spots along the plurality of machining paths in step (f).

40. The method according to claim 27, wherein the plurality of parallel processing beam paths are substantially equally spaced in a direction of the longitudinal axis of the optical fiber, whereby the repetitive diffractive structure is a periodic diffractive structure.

* * * * *